(12) United States Patent
Deo et al.

(10) Patent No.: US 7,444,143 B2
(45) Date of Patent: *Oct. 28, 2008

(54) WIRELESS DATABASE ENVIRONMENT FOR A SMALL DEVICE

(75) Inventors: Vinay Deo, Bellevue, WA (US); Michael J. O'Leary, Redmond, WA (US); Robert B. Seidensticker, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 579 days.

This patent is subject to a terminal disclaimer.

(21) Appl. No.: 10/996,205

(22) Filed: Nov. 23, 2004

(65) Prior Publication Data

US 2005/0076069 A1    Apr. 7, 2005

Related U.S. Application Data

(63) Continuation of application No. 09/107,916, filed on Jun. 30, 1998, now Pat. No. 6,832,084.

(60) Provisional application No. 60/070,720, filed on Jan. 7, 1998.

(51) Int. Cl.
*H04M 3/00* (2006.01)

(52) U.S. Cl. .................................................. 455/419

(58) Field of Classification Search ............... 455/419, 455/412, 414.1, 418, 38.1, 31.2, 422; 340/825.44, 340/825.26, 825.27, 7.52; 707/10, 104, 3, 707/4

See application file for complete search history.

(56) References Cited

U.S. PATENT DOCUMENTS

| | | | |
|---|---|---|---|
| 4,862,390 A | 8/1989 | Weiner | 364/521 |
| 5,121,470 A | 6/1992 | Trautman | 395/140 |
| 5,206,931 A | 4/1993 | Kimura et al. | 395/161 |
| 5,295,241 A | 3/1994 | Eagen et al. | 364/157 |
| 5,317,306 A | 5/1994 | Abraham et al. | 345/118 |
| 5,333,316 A | 7/1994 | Champagne et al. | 707/8 |
| 5,384,579 A | 1/1995 | Nakasuji et al. | 345/123 |
| 5,396,264 A | 3/1995 | Falcone et al. | 340/146 |
| 5,485,175 A | 1/1996 | Suzuki | 395/156 |
| 5,495,566 A | 2/1996 | Kwatinetz | 395/157 |
| 5,510,811 A | 4/1996 | Tobey et al. | 345/157 |
| 5,563,631 A | 10/1996 | Masunaga | 345/169 |
| 5,568,603 A | 10/1996 | Chen et al. | 395/155 |
| 5,655,094 A | 8/1997 | Cline et al. | 395/341 |
| 5,659,665 A | 8/1997 | Whelpley, Jr. | 395/284 |
| 5,666,502 A | 9/1997 | Capps | 345/352 |

(Continued)

FOREIGN PATENT DOCUMENTS

JP    08275220    10/1996

OTHER PUBLICATIONS

Advanced Interface Design Guide, IBM Corp., 59-61, 63-72, Jun. 1989.

(Continued)

*Primary Examiner*—Melody Mehrpour
(74) *Attorney, Agent, or Firm*—Shook, Hardy & Bacon, L.L.P.

(57) ABSTRACT

The wireless environment includes an object processing module to process objects obtained from a wireless receiver on the mobile device. The object processing module processes the object to alter data stored in memory on the mobile device.

32 Claims, 12 Drawing Sheets

U.S. PATENT DOCUMENTS

| | | | |
|---|---|---|---|
| 5,666,526 A | 9/1997 | Reiter et al. | 707/2 |
| 5,673,401 A | 9/1997 | Volk et al. | 395/327 |
| 5,677,708 A | 10/1997 | Matthews, III et al. | 345/115 |
| 5,689,668 A | 11/1997 | Beaudet et al. | 395/353 |
| 5,689,669 A | 11/1997 | Lynch et al. | 395/355 |
| 5,689,807 A | 11/1997 | Wong et al. | 455/38.1 |
| 5,696,686 A | 12/1997 | Sanka et al. | 343/705 |
| 5,754,306 A | 5/1998 | Taylor et al. | 358/400 |
| 5,757,279 A | 5/1998 | Fujiwara | 340/825.44 |
| 5,758,295 A | 5/1998 | Ahlberg et al. | 455/566 |
| 5,760,776 A | 6/1998 | McGurrin et al. | 345/353 |
| 5,761,610 A | 6/1998 | Sorensen et al. | 455/89 |
| 5,790,115 A | 8/1998 | Pleyer et al. | 345/327 |
| 5,812,117 A | 9/1998 | Moon | 345/169 |
| 5,815,142 A | 9/1998 | Allard et al. | 345/173 |
| 5,819,108 A | 10/1998 | Hsu et al. | 395/830 |
| 5,848,064 A | 12/1998 | Cowan | 370/338 |
| 5,848,373 A | 12/1998 | DeLorme et al. | 701/200 |
| 5,969,698 A | 10/1999 | Richard et al. | 345/7 |
| 5,973,612 A | 10/1999 | Deo et al. | 340/825.44 |
| 5,999,088 A | 12/1999 | Sibbitt | 340/311.1 |
| 6,011,976 A | 1/2000 | Michaels | 455/466 |
| 6,031,830 A | 2/2000 | Cowan et al. | 370/338 |
| 6,125,281 A | 9/2000 | Wells et al. | 455/466 |
| 6,125,360 A | 9/2000 | Witkowski et al. | 707/2 |
| 6,128,012 A | 10/2000 | Seidensticker, Jr. et al. | 345/336 |
| 6,202,060 B1 | 3/2001 | Tran | 707/3 |
| 6,212,527 B1 | 4/2001 | Gustman | 707/102 |
| 6,226,665 B1 | 5/2001 | Deo et al. | 709/106 |
| 6,493,717 B1 | 12/2002 | Junkin | 707/102 |

OTHER PUBLICATIONS

Cowart, "Mastering Windows 3.1", Sybex, Inc., pp. 18-20, 28-29, 266-267, 414-417, 836-838, 1993.
Cowart, "Mastering Windows 3.1", Sybex, pp. 268-269, 1993.
Microsoft Schedule = v7.0a, Microsoft Corp., screen dump pp. 1-13, 1996.

US 7,444,143 B2

WIRELESS DATABASE ENVIRONMENT FOR A SMALL DEVICE

REFERENCE TO CO-PENDING PATENT APPLICATIONS

The present application is a continuation of U.S. patent application Ser. No. 09/107,916, filed on Jun. 30, 1998, the contents of which are hereby incorporated by reference in their entirety, which claims the benefit of U.S. provisional patent application Ser. No. 60/070,720 filed on Jan. 7, 1998.

FIELD OF THE INVENTION

The present invention generally relates to a microcomputer for executing software applications. More particularly, the present invention pertains to a wireless environment for updating small software applications (applets) and databases. The present invention further includes a viewer module for viewing databases on the microcomputer.

BACKGROUND OF THE INVENTION

On the first personal computers (PCs) developed by IBM, the operating system and applications executed were relatively compact, sharing about one megabyte of address space. PCs including desktop and portable laptop computers have subsequently evolved to much more sophisticated designs. Graphic operating systems and applications requiring much more memory have become common, and it is not unusual for PCs and laptop computers to be sold with 16 or more megabytes of random access memory (RAM) installed. In contrast to the increasing amount of RAM installed on PCs, portable personal information (PIM) devices have recently been introduced that include a microcomputer or microprocessor provided with only enough RAM to enable the dedicated PIM functions to be performed. PIM devices must be distinguished from personal data assistants (PDAs) that include sufficient RAM to enable small application programs specifically developed for the PDA to be executed. PIM devices provide very limited computational functions, and much of the functionality of the devices is programmed into read only memory (ROM). RAM is typically not provided on a PIM device for running application programs that are downloaded into non-volatile read/write memory. An example of a PIM device is the Timex DATA LINK wristwatch, which provides timekeeping functions and stores PIM data that are downloaded from a PC through a sensor that responds to a predefined modulation of scan lines on the PC monitor.

Data can be downloaded into a non-volatile read/write memory of a portable computing device such as a laptop computer from a conventional PC using a variety of different mediums, including: radio frequency (RF) links, infrared (IR) data links, and data cable connections. In addition to the screen modulation technique noted above, these same data transfer mediums can be employed to download data into a portable PIM device. A PC is preferably used for compiling/entering the data, since the keyboard of the PC permits more efficient data entry, the hard drive of a PC conveniently provides long term storage, and data are more easily reviewed on the PC display. Application programs are not normally downloaded to a PIM device from a PC, because the 2-4 Kbytes (or less) of RAM provided on the typical PIM device is generally considered too small for executing downloaded code.

More recently, however, a combination pager and PIM device has been developed that will receive conventional paging messages and paging objects that are used to update PIM data and other data maintained in non-volatile read/write memory in the device. The data stored in the device includes the typical PIM type of data noted above, e.g., addresses, telephone numbers, and names. However, the dual purpose paging device requires that it also be capable of executing small application programs called "applets" using the very limited amounts of RAM provided on the device, i.e., typically less than 4 Kbytes. Those familiar with programming applications for execution by a microprocessor will appreciate that with even the most careful and efficient coding, it is generally not possible to implement more than a trivial application with machine instructions that will fit into 4 Kbytes of RAM. Accordingly, a new approach was developed and is described in co-pending application entitled "APPLICATION EXECUTION ENVIRONMENT FOR A SMALL DEVICE", Ser. No. 08/825,645, filed Apr. 3, 1997, now U.S. Pat. No. 6,226,665, issued May 21, 2001, which is hereby incorporated by reference, allows processing of larger amounts of application code in a very limited amount of RAM.

Another problem with current remote devices involves updating the information downloaded to the remote device. Commonly, the user must return to a personal computer or other downloading station in order to download a new dataset that has been updated with new information. Although a PIM device, such as the watch described above, can updated without an electrical connection between the watch and the updating computer, such a system still requires the user to return to the computer in order to receive the update. In addition, the user must download the complete dataset although only small portion may have been updated.

SUMMARY OF THE INVENTION

The wireless environment includes an object processing module to process objects obtained from a wireless receiver on the mobile device. The object processing module processes the object to alter data stored in memory on the mobile device.

DETAILED DESCRIPTION OF THE PREFERRED EMBODIMENTS

Figure 1:
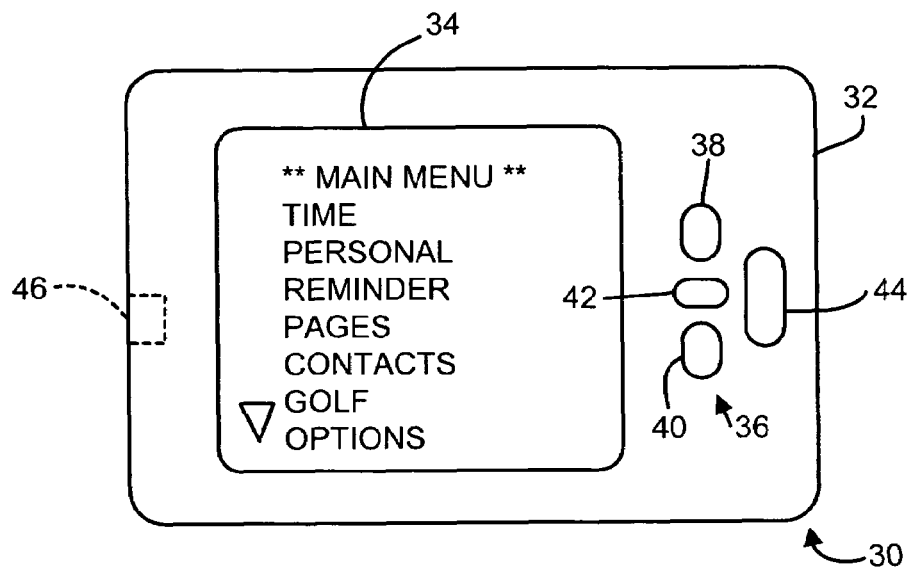
FIG. 1 is a plan view of a first embodiment of a mobile device embodying the present invention.

An exemplary form of the present invention is embodied in a combination pager and data management device 30 illustrated in FIG. 1. However, it is contemplated that the present invention can also be practiced using other readily portable "mobile" electronic devices having a limited memory and resources for executing application software. For example, a combination cellular phone and data management device employing the present invention would achieve virtually all of the benefits and advantages of the present invention. Such devices will have enhanced utility compared to existing portable PIM devices and other portable electronic devices, and the functions and compact size of such devices will more likely encourage the user to carry the device at all times. Accordingly, it is not intended that the scope of the present invention be limited by the disclosure of the invention as embodied in an exemplary pager and PIM device 30.

A top view of the pager and data management mobile device 30 is shown in FIG. 1. The mobile device 30 includes a housing 32 and has a user interface that includes a plurality of keys 36 disposed on the top of the housing 32 and having four buttons that are used to control a display 34 and the functions performed in connection with its conventional paging function and its PIM data management functions. The buttons comprise an Action button 42, a Back button 44, an Up button 38, and a Down button 40. The buttons navigate the user through a directory/menu hierarchy like that shown in FIG. 1. The Action/Back buttons 42, 44 are paired as opposites, having a pair functionality similar to that of the Enter and Escape keys on a conventional QWERTY keyboard. The Action button 42 takes the user in (to a selected lower level) and the Back button 44 takes the user out (to a next higher or parent level in a the hierarchical structure). The Up/Down buttons 38, 40 are another functional pair of buttons that move the user up and down within the display 34. Display 34 is preferably a liquid crystal display (LCD), which in the preferred embodiment can display a maximum of eight lines, with 17 characters per line. Other types and sizes of displays can alternatively be used, as appropriate for the type of device in which the present invention is included.

Figure 2:
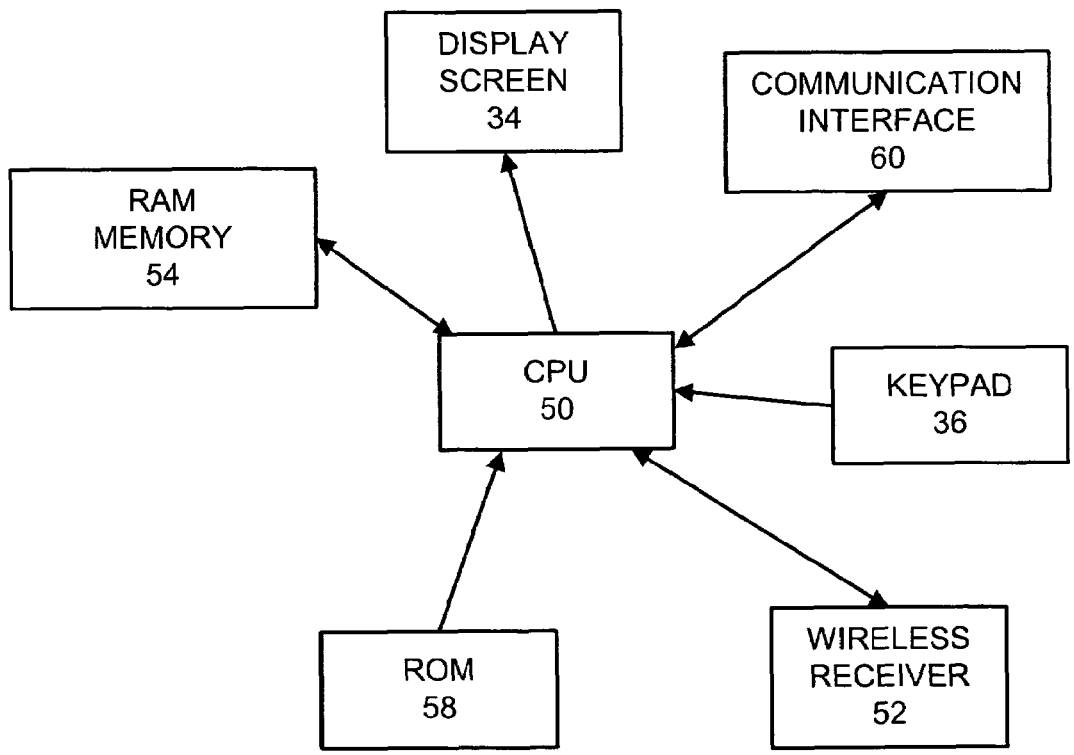
FIG. 2 is a schematic functional block diagram of the mobile device of FIG. 1.

Referring now to FIG. 2, a block diagram illustrates the functional components comprising the mobile device 30. An eight-bit central processing unit (CPU) 50 implements the software controlled functions, although it will be understood that CPUs employing either more or fewer bits can alternatively be employed. CPU 50 is coupled to display 34 so that text and graphic icons generated in accordance with the controlling software appear on the display 34. Data that are downloaded or entered by the user into the mobile device 30 are stored in a non-volatile read/write memory store 54, and this memory is bidirectionally coupled to the CPU, which reads and writes the data in a serial stream. In one embodiment, the CPU is a Zilog Corporation, type Z80 running from 2-4 MHz. The capacity of non-volatile read/write memory store 54, which is provided as battery-backed random access memory (RAM), is only about 16 KB in the exemplary embodiment. The RAM 54 provides volatile storage for instructions that are executed by the CPU when applets are run on the mobile device 30, and storage for temporary data, such as register values. Default values for configuration options and other variables are stored in a ROM 58. The ROM 58 is also used to store the operating system software for the device that controls the basic functionality of the mobile device 30, e.g., its conventional paging function and other operating system kernel functions, e.g., the loading of applet software components into RAM 56.

Memory 54 simply serves as storage for the code in a manner analogous to the function of a hard drive on a PC that is used to store application programs, i.e., storing the applet code until the applet is required to be executed by a user. It should be noted that although non-volatile memory is used for storing the applet code, it can alternatively be stored in a volatile memory that is not used for execution of the code. Further, if more than one applet is stored in this storage memory (non-volatile or volatile), the total size of the code for all such applets must be less than the capacity of the storage memory. The applets are written in compact p-code, which allows them to be extremely small in size compared to more conventional application programs written to be executed on PCs. The p-code is processor independent, since the operating system for a specific type of processor can translate the p-code into the required machine instructions needed for that type of processor.

The p-code is divided into modules or software components. Operating as a state machine, specific modules of p-code are swapped into the RAM of the mobile device 30 for execution by the CPU so that an extremely small run-time footprint in memory is required when executing an applet.

Paging signals received by the mobile device 30 are handled through a wireless receiver 52, which is coupled to CPU 50. As already noted, keys 36 provide a simple user interface to permit control of the mobile device 30, editing, and other user determined selections entered with the four buttons 38, 40, 42, and 44. Since the data stored in non-volatile memory 54 are likely to be more extensive than a user would care to enter using only the four buttons, such data are more efficiently entered on a computer 55 (FIG. 6) and downloaded to the mobile device 30 through a communication interface 60. The interface 60 comprises an infrared sensor/transmitter 46 (shown in FIG. 1), which communicates through an infrared data port 57 of the computer 55. Similarly, data are typically uploaded to the computer 55 from the mobile device 30 through the IR interface. As will be described below, data can alternatively be downloaded from the computer 55 to the mobile device 30 through a paging signal transmission to be wireless receiver 52.

Display 34 is employed to present bitmapped characters in 8 rows by 17 columns, allowing a substantial amount of information to be viewed at one time. Although not shown in FIG. 1, above the display area of the mobile device 30 is a row of icons indicating other aspects of the device, and on the left-hand side of the display area may be one or two auxiliary icons resembling up and down arrows. These arrow icons are used to indicate that lines of items are available above and/or below the lines currently shown on the display. Specifically, the up arrow icon indicates that hidden lines exist above the visible text, and the down arrow icon indicates hidden lines exist below the visible text.

Navigation on the mobile device 30 is done with hierarchical menus, enabling the user to move through a tree structure. FIG. 1 illustrates the Main Menu on display 34. The first line of a menu may be its title ("MAIN MENU" in this case). The menu title is in upper case and is set off with asterisks to visually distinguish it from the other items in the menu.

The user moves a selection line (which causes the line to appear in reverse video on the display) up and down to select a desired list item. When the selection line is at the bottom and the down arrow icon is showing on the display 34, the next Down button 40 push scrolls the list up one line, keeping the selection line at the bottom. When the selection line is on the last list item, the down arrow icon is no longer displayed, and additional Down button 40 pushes do nothing. The analogous process applies to the Up button 38. The title line is never selectable, but it scrolls off the display 34 as if it were just another list item, as depression of the Down button 40 moves the selected line below the original bottom line displayed. These same rules normally apply when applets are being executed on the mobile device 30 that display information to the user.

Figure 3:
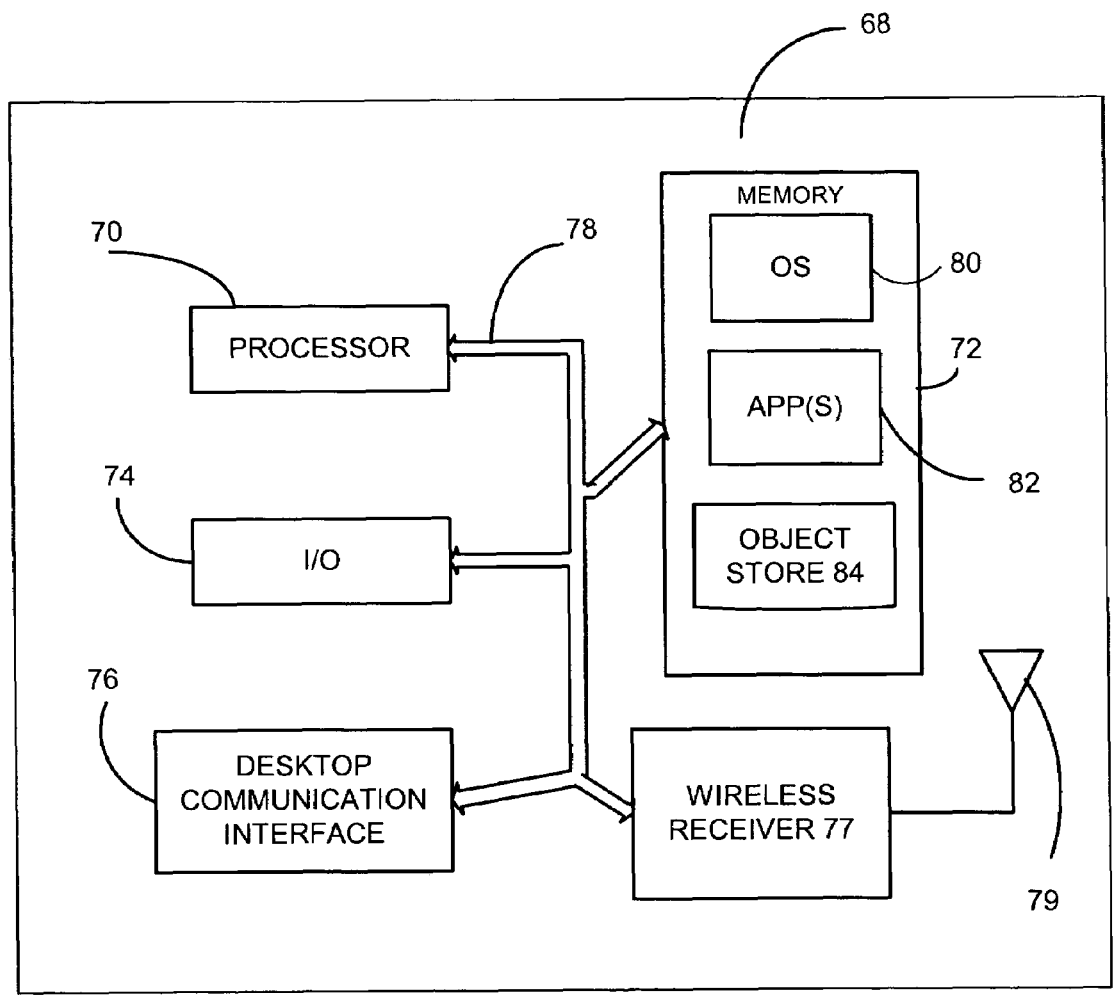
FIG. 3 is a block diagram of a second embodiment of a mobile device.

FIG. 3 is a block diagram of another exemplary mobile device 68. Mobile device 68 includes microprocessor 70, memory 72, input/output (I/O) components 74, a communication interface 76 for communicating with the computer 55, wireless receiver 77 and an antenna 79. In a preferred embodiment, these components of mobile device 68 are coupled for communication with one another over a suitable bus 78.

Memory 72 is implemented as non-volatile electronic memory such as random access memory (RAM) with a battery back-up module (not shown) such that information stored in memory 72 is not lost when the general power to mobile device 68 is shut down. A portion of memory 72 is preferably allocated as addressable memory for program execution, while another portion of memory 72 is preferably used for storage, such as to simulate storage on a disc drive.

Memory 72 includes an operating system 80, an application program 82 (such as a personal information manager or PIM) as well as an object store 84. During operation, operating system 80 is preferably executed by processor 70 from memory 72. Operating system 80, in one preferred embodiment, is a Windows CE brand operating system commercially available from Microsoft Corporation. The operating system 80 is preferably designed for mobile devices, and implements database features which can be utilized by PIM 82 through a set of exposed application programming interfaces and methods. The objects in object store 84 are preferably maintained by PIM 42 and operating system 80, at least partially in response to calls to the exposed application programming interfaces and methods.

Communication interface 76 is optionally provided as any suitable communication interface. Interface 76 is preferably used to communicate with computer 55, or optionally another mobile device 38. Thus, communication interface 36 includes synchronization components for communicating with computer 55. The wireless receiver 77 is used for receiving information from a wireless carrier, not shown.

Figure 4:
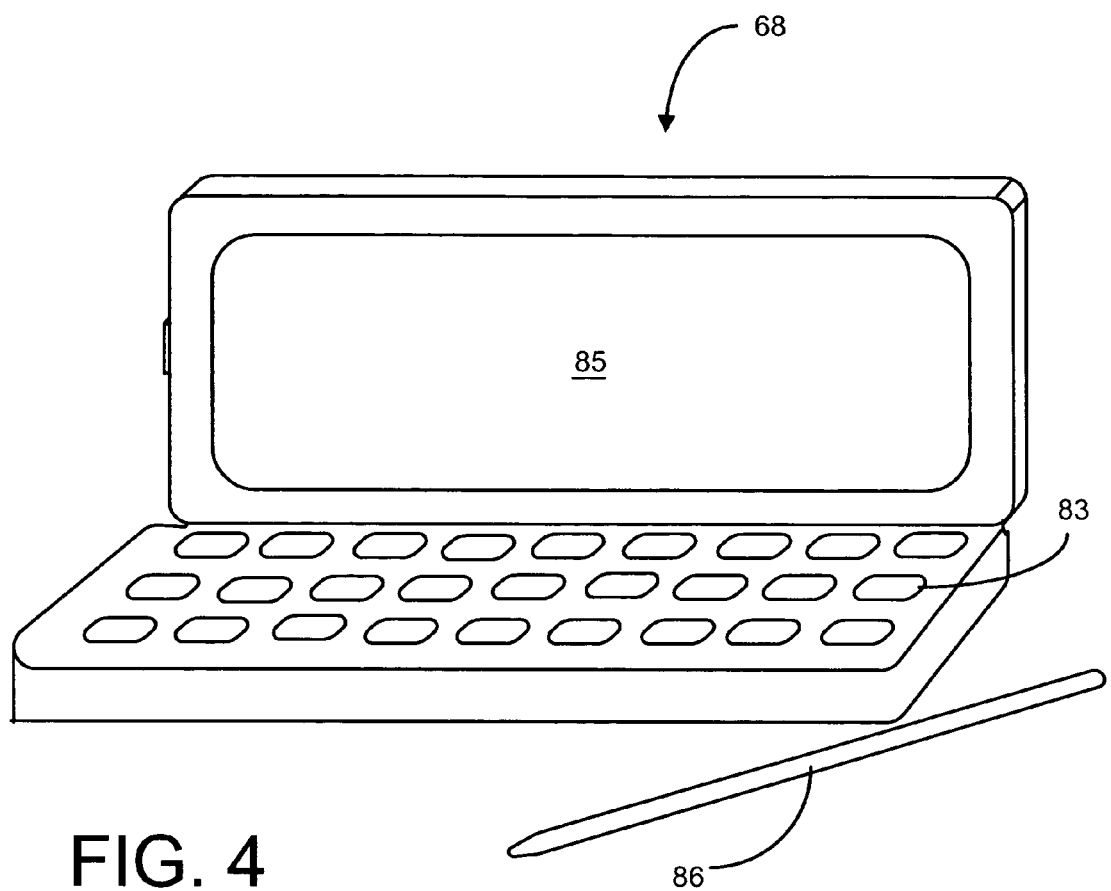
FIG. 4 is a simplified pictorial illustration of the second embodiment of the mobile device shown in FIG. 3.

FIG. 4 is a simplified pictorial illustration of the mobile device 68, which can be used in accordance with the present invention. Mobile device 68, as illustrated in FIG. 4, can be a desktop assistant sold under the designation H/PC having software provided by the Microsoft Corporation. In one embodiment, mobile device 18 includes a miniaturized keyboard 83, display 85 and stylus 86. In the embodiment shown in FIG. 4, display 85 is a liquid crystal display (LCD) which uses a contact sensitive display screen in conjunction with stylus 86. Stylus 86 is used to press or contact the display 85 at designated coordinates to accomplish certain user input functions. Miniaturized keyboard 83 is preferably implemented as a miniaturized alpha-numeric keyboard, with any suitable and desired function keys which are also provided for accomplishing certain user input functions.

Figure 5:
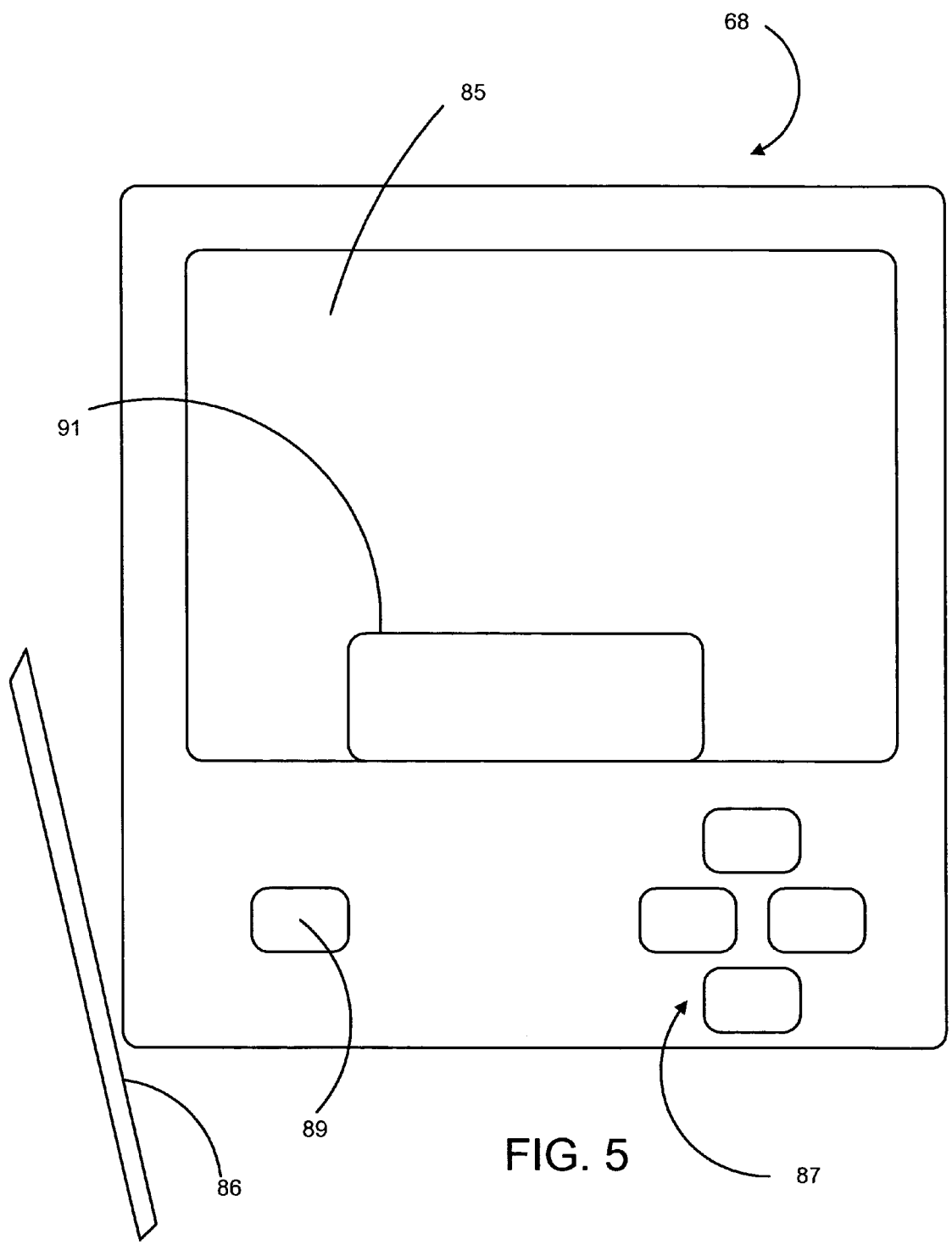
FIG. 5 is a simplified pictorial illustration of another embodiment of the mobile device shown in FIG. 3.

FIG. 5 is another simplified pictorial illustration of the mobile device 68 in accordance with another preferred embodiment of the present invention. Mobile device 68, as illustrated in FIG. 5, includes some items which are similar to those described with respect to FIG. 4, and are similarly numbered. For instance, mobile device 68, as shown in FIG. 5, also includes touch sensitive screen 85 which can be used, in conjunction with stylus 86, to accomplish certain user input functions. It should be noted that the display 85 for the mobile device as shown in FIGS. 4 and 5 can be the same size as one another, or different sizes from one another, but would typically be much smaller than a conventional display used with a desktop computer. For example, displays 85 shown in FIGS. 4 and 5 may be defined by a matrix of only 240×320 coordinates, or 160×160 coordinates, or any other suitable size.

The mobile device 68 shown in FIG. 5 also includes a number of user input keys or buttons (such as scroll buttons 87) which allow the user to scroll through menu options or other display options which are displayed on display 85, or which allow the user to change applications, without contacting display 85. In addition, the mobile device 68 also shown in FIG. 5 also preferably includes a power button 89 which can be used to turn on and off the general power to the mobile device 68.

It should also be noted that, in the embodiment illustrated in FIG. 5, mobile device 68 includes a hand writing area 91. Hand writing area 91 can be used in conjunction with stylus 86 such that the user can write messages which are stored in memory 82 for later use by the mobile device 68. In one illustrative embodiment, the hand written messages are simply stored in hand written form and can be recalled by the user and displayed on the display screen 85 such that the user can review the hand written messages entered into the mobile device 68. In another preferred embodiment, mobile device 68 is provided with a character recognition module such that the user can enter alpha-numeric information into mobile device 68 by writing that alpha-numeric information on area 91 with stylus 86. In that instance, character recognition module in the mobile device 68 recognizes the alpha-numeric characters and converts the characters into computer recognizable alpha-numeric characters which can be used by the application programs 82 in mobile device 68.

Figure 6:
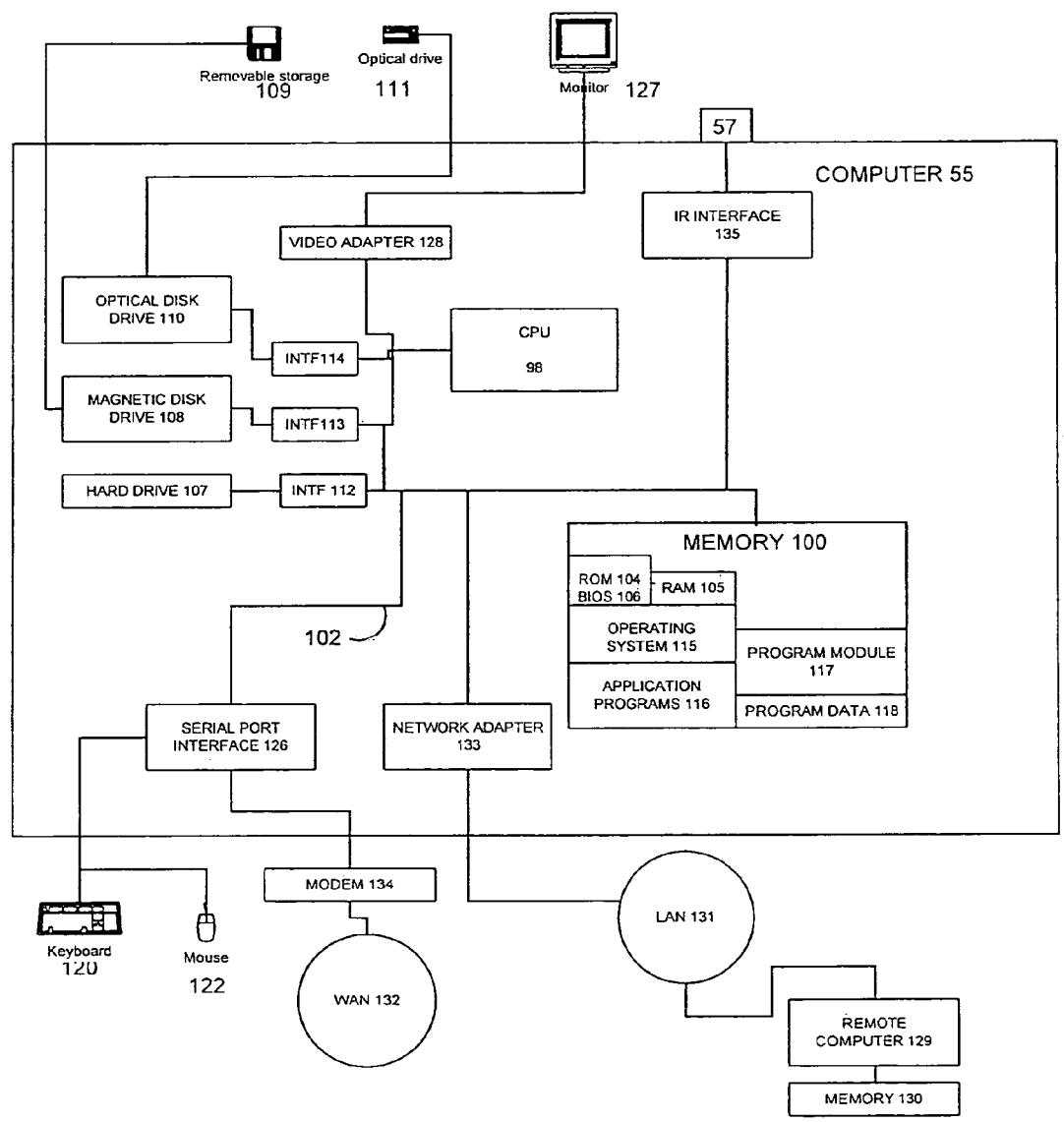
FIG. 6 is a block diagram of one embodiment of a desktop computer.

FIG. 6 and the related discussion are intended to provide a brief, general description of a suitable desktop computer 55 in which portions of the invention may be implemented. Although not required, the invention will be described, at least in part, in the general context of computer-executable instructions, such as program modules, being executed by a personal computer 55 or mobile devices 30 and 68. Generally, program modules include routine programs, objects, components, data structures, etc. that perform particular tasks or implement particular abstract data types. Moreover, those skilled in the art will appreciate that desktop computer 55 may be implemented with other computer system configurations, including multiprocessor systems, microprocessor-based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 6, an exemplary system for implementing desktop computer 55 includes a general purpose computing device in the form of a conventional personal computer 55, including processing unit 98, a system memory 100, and a system bus 102 that couples various system components including the system memory 100 to the processing unit 98. The system bus 102 can be any of several types of bus structures including a memory bus or memory controller, a peripheral bus, and a local bus using any of a variety of bus architectures. The system memory 100 includes read only memory (ROM) 104 a random access memory (RAM) 105. A basic input/output system (BIOS) 106, containing the basic routine that helps to transfer information between elements within the desktop computer 55, such as during start-up, is stored in ROM 104. The desktop computer 55 further includes a hard disk drive 107 for reading from and writing to a hard disk (not shown), a magnetic disk drive 108 for reading from or writing to removable magnetic disk 109, and an optical disk drive 110 for reading from or writing to a removable optical disk 111 such as a CD ROM or other optical media. The hard disk drive 107, magnetic disk drive 108, and optical disk drive 110 are connected to the system bus 102 by a hard disk drive interface 112, magnetic disk drive interface 113, and an optical drive interface 114, respectively. The drives and the associated computer-readable media provide nonvolatile storage of computer readable instructions, data structures, program modules and other data for the desktop computer 55.

Although the exemplary environment described herein employs a hard disk, a removable magnetic disk 109 and a removable optical disk 111, it should be appreciated by those skilled in the art that other types of computer readable media which can store data that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules can be stored on the hard disk, magnetic disk 109, optical disk 111, ROM 104 or RAM 105, including an operating system 115, one or more application programs 116 (which may include PIMs), other program modules 117 (which may include synchronization components for synchronizing data between the desktop computer 55 and the mobile device 30 or 68), and program data 118. A user can enter commands and information into the desktop computer 55 through input devices such as a keyboard 120, pointing device 122. Other input devices (not shown) may include a microphone, joystick, game pad, satellite dish, scanner, or the like. These and other input devices are often connected to the processing unit 98 through a serial port interface 126 that is coupled to the system bus 102, but may be connected by other interfaces, such as a sound card, a parallel port, game port or a universal serial bus (USB). A monitor 127 or other type of display device is also connected to the system bus 102 via an interface, such as a video adapter 128. In addition to the monitor 127, desktop computers can typically include other peripheral output devices such as speakers and printers.

The desktop computer 55 may operate in a networked environment using logic connections to one or more remote computers (other than mobile device 30 or 68), such as a remote computer 129. The remote computer 129 can be another personal computer, a server, a router, a network PC, a peer device or other network node, and typically includes many or all of the elements described above relative to desktop computer 55, although only a memory storage device 130 has been illustrated in FIG. 6. The logic connections depicted in FIG. 6 include a local area network (LAN) 131 and a wide area network (WAN) 132. Such networking environments are commonplace in offices, enterprise-wide computer network intranets and the Internet.

When used in a LAN networking environment, the desktop computer 55 is connected to the local area network 131 through a network interface or adapter 133. When used in a WAN networking environment, the desktop computer 55 typically includes a modem 134 or other means for establishing communications over the wide area network 132, such as the Internet. The modem 134, which may be internal or external, is connected to the system bus 102 via the serial port interface 126. In a network environment, program modules depicted relative to desktop computer 55, or portions thereof, may be stored in the remote memory storage devices. It will be appreciated that the network connections shown are exemplary and other means of establishing a communications link between the computers may be used.

Desktop computer 55 runs operating system 115 that is typically stored in non-volatile memory 104 and executes on the processor 98. One suitable operating system is a Windows brand operating system sold by Microsoft Corporation, such as Windows 95 or Windows NT, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, N.Y. Application programs are preferably stored in program module 117, in volatile memory or non-volatile memory, or can be loaded into any of the components shown in FIG. 6 from a floppy diskette 109, CD ROM drive 111, downloaded from a network via network adapter 133, or loaded using another suitable mechanism.

The infrared data port 57 connects to the system bus 102 through an interface 135, which as stated data above can be used to download data to the mobile devices 30 and 68 when placed in proximity to the computer 55. Alternatively, data can be provided to the mobile devices 30 and 68 through a wireless paging network accessible by the computer 55 directly via a modem or through the LAN 131 or the WAN 132 networks.

Figure 7:
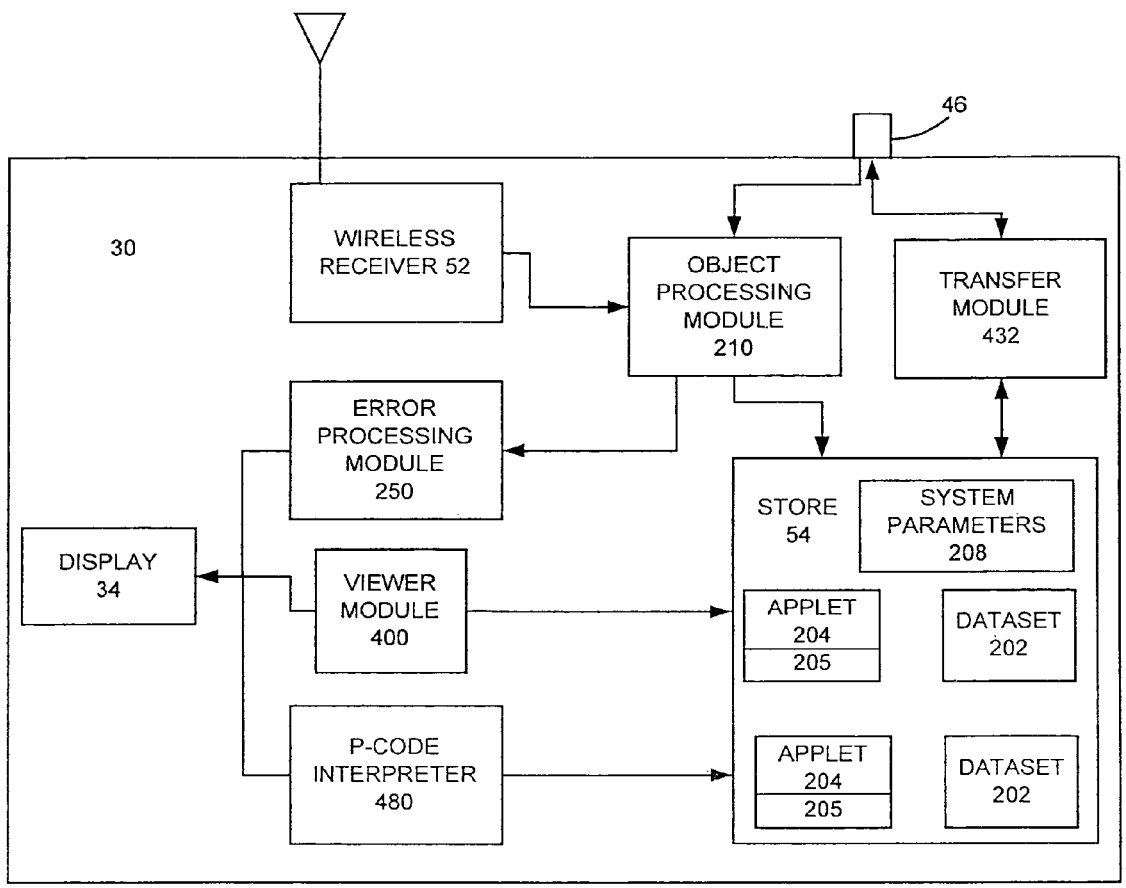
FIG. 7 is a block diagram of the mobile device of FIG. 1 illustrating aspects of the present invention.

FIG. 7 is a functional block diagram of the mobile device 30 for purposes of illustrating aspects of the present invention. Although described below with respect to the mobile device 30, it should be understood that the present invention can also be implemented in the mobile device 68 or other similar portable devices. The mobile device 30 includes the wireless receiver 52 discussed above. The wireless receiver 52 receives incoming messages to update information residing in memory store 54. As discussed below, the incoming messages, herein referred as "objects", are used to update data stored in the memory store 54. The memory store 54 stores information used by the mobile device 30 and includes datasets 202. Each dataset 202 comprises a database or list of information organized by individual records. Each individual record typically comprises multiple fields. For example, a dataset 202 can include a list of reminders comprising dates and times for performing tasks wherein the tasks are stored as string messages. In addition, a dataset 202 can also be a "contacts" list having names, addresses and phone numbers of various people or organizations stored for the user. The memory store 54 further stores applets 204 discussed above. Commonly, each applet 204 includes corresponding applet data 205 that the applet 204 uses and can execute calculations thereon. In yet another memory location in memory store 54, a system parameters list 208 can be maintained. The system parameters list 208 can include such information as when the mobile device 30 will be active and produce audible tones for incoming messages, and when the mobile device 30 is in "night mode", where the mobile device 30 will receive incoming messages, but not produce audible tones. Other system parameters can include the current date and time and various types of audible tones to be produced for different types of incoming messages.

One aspect of the present invention includes an object processing module 210 that is used to update the memory store 54 with information received over the air through the wireless receiver 52 from a wireless transmitter such as a paging network. The object processing module 210 processes received objects to update the information stored in memory store 54 and, in particular, to update the information stored in the datasets 202, the applets 204, the applet data 205 or the system parameters list 208.

Figure 8:
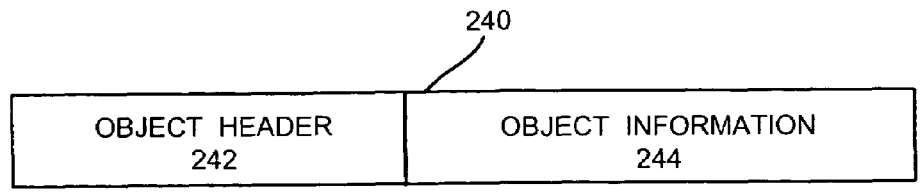
FIG. 8 is a pictorial representation of an object received by the mobile device.

FIG. 8 is a pictorial representation of an object 240 transmitted through the wireless transport and received by the wireless receiver 52. Generally, the object 240 includes an object header 242 and object information 244. The object header 242 contains relevant information as to the type, action and location of the information that will be updated in the memory store 54. The object information 244 includes the new data, if any, that will be added to or changed in the memory store 54.

Figure 9:
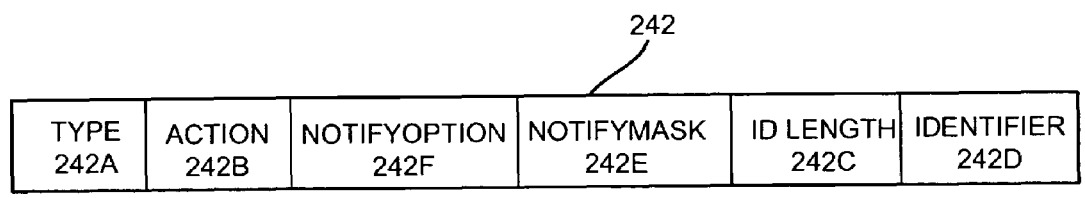
FIG. 9 is a pictorial representation of an object header.

An exemplary embodiment of the object header 242 is illustrated in detail in FIG. 9. In this embodiment, the object header 242 includes multiple portions 242A, 242B, 242C, 242D, 242E and 242F. Each portion 242A-242F contains specific information for locating or updating the information stored in memory store 54. Portion 242A contains an encoded value indicative of the type of information contained in the object information 244. For instance, a first preselected value can be used to indicate that the object information 244 contains data for completely replacing a current dataset 202 stored in the memory store 54, or contains information for a new dataset 202 to be stored in the memory store 54. Similarly, a second preselected value in portion 242A can be used to indicate that the object information 244 is an applet that will be used to replace an existing applet 204 currently on the mobile device 30, or a new applet that will be installed in the memory store 54. Other preselected values in portion 242A can be used to indicate that the object information 244 includes data for a record of a particular dataset 202. For example, a third preselected value located in portion 242A can indicate that the object information 244 pertains to an individual record of a particular dataset 202 such as a "reminder" dataset, or a "contacts" dataset. Other preselected values can be assigned as necessary to denote other information stored in the memory store 54. For instance, another preselected value can be used to denote that the object information 244 pertains to a generic record of a dataset 202. Yet another value can be preselected to indicate that the object information 244 pertains to a radio address or capcode programming of the mobile device 30. Generally, the size of portion 242A is small wherein one byte is typically sufficient to encode the information.

Figure 10:
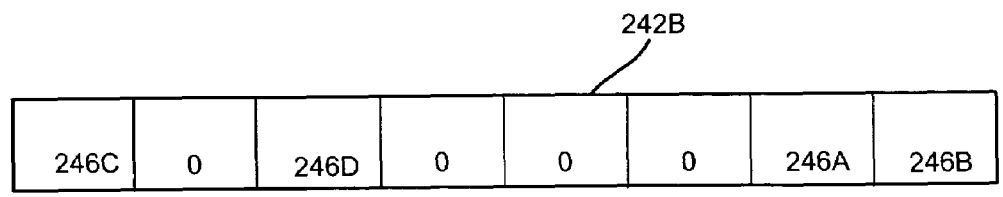
FIGS. 10-12 are pictorial representations of portions of the object header.

Portion 242B is illustrated in detail in FIG. 10. Generally, portion 242B contains a value indicative of the action to be performed for updating the information in the memory store 54. A first preselected value is used to indicate that the object information 244 is to be added to the memory store 54, while a second preselected value is used to indicate that the object information 244 will replace information in the memory store 54. A third preselected value is used to indicate that information in the memory store 54 will be deleted. In the embodiment illustrated in FIG. 10, portion 242B is a single byte of data wherein the operations of "add", "change" and "delete" are encoded in bits 246A and 246B. A third bit 246C is used to indicate whether unique identifiers associated with each of the datasets 202, applets 204 or the system parameter list 208 must match before the "add", "change" or "delete" operation will be performed.

As will be discussed below, each dataset 202 includes a unique identifier that is used to identify the dataset from all other information stored in the memory store 54. Commonly, the dataset also includes an associated "title" that allows the user to easily identify the dataset on the "main menu" as illustrated in FIG. 1. The title is displayed on the display 34, while the unique identifier associated with the dataset is not displayed, but is used to identify the dataset when information is to be updated. When shipped from the factory, the mobile device 30 can include standard datasets such as a "reminder" or "calendar" dataset and a "contacts" dataset. As shipped, each mobile device may have the same identifier for each "reminder" dataset, and the same identifier for each "contacts" dataset, although the "contacts" identifier will be different than the identifier used for the "reminder" dataset. Typically, during the initialization procedure, a user will change each of the identifiers on the mobile device 30 in order that when information is transmitted to the mobile device 30, it only updates the information of the user's mobile device 30 and does not alter information stored on any other mobile device 30. Nevertheless, in certain situations, it may be necessary to update information, such as a particular record stored in the "contacts" dataset of a plurality of users. Rather than sending multiple messages to each user to update the information stored in the "contacts" dataset, a single message can be simultaneously transmitted to all users to update the information where the bit 246C is set so that an identifier match is not necessary to update the information.

In yet a further embodiment, portion 242B also includes information as to whether the user should be alerted of any errors that occurred when the object 240 is processed by the object processing module 210. In the embodiment illustrated, a fourth bit 246D is used to indicate when errors will be reported. Specifically, if bit 246D is set, and an error occurs during processing of an incoming object 240, information is provided by the object processing module 210 to an error processing module 250, illustrated in FIG. 7, indicative of the error that has occurred. For example, if the object 240 being processed pertains to a new record for the "contacts" dataset and that record included an error such as invalid data representing a phone number, the error processing module 250 alerts the user through the display 34 that a new record for the "contacts" dataset was received but could not be processed. In general, the information provided by the object processing module 210 to the error processing module 250 is as much as can be ascertained about the error and/or the appropriate dataset 202, applet 204 or other information being updated in the memory store 54.

Referring back to FIG. 9, portions 242C and 242D pertain to the unique identifier used to identify the information to be updated in the memory store 54. Portion 242C contains a value indicative of the number of bytes in portion 242D. Portion 242D contains the unique identifier to identify the information stored in memory store 54 that will be updated.

It should be noted that portion 242C can have a value such as zero that would indicate that portion 242D does not exist. The object header 242 always identifies the information to be updated based upon the value contained in portion 242A.

Figure 11:
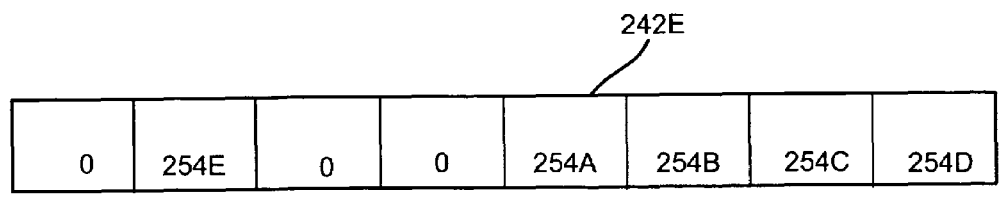
Figure 12:
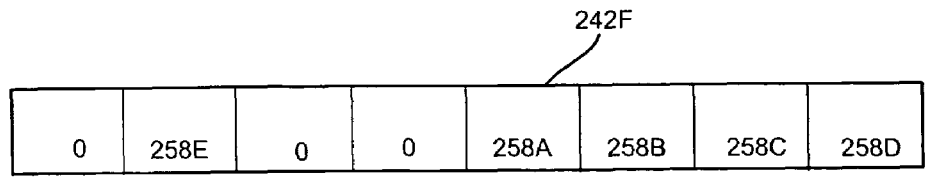

In the embodiment illustrated, the object header 242 also includes portions 242E and 242F. Portions 242E and 242F are not required in order to process the object 240 and update the memory store 54. Rather, portions 242E and 242F contain information used to alert the user that a specific type of object has been received. For instance, a user may desire a first type of audible tone to be generated by the mobile device 30 when information pertaining to the "reminder" dataset is to be updated, while a second type of audible tone is to be generated if the information pertains to the "contacts" dataset. Portion 242E, as illustrated in FIG. 11, is a single byte wherein bits 254A, 254B, 254C and 254D are set when the mobile device 30 should use preselected audible tones stored in the mobile device 30 when objects pertaining to certain datasets are received. If bits 254A-254D are not set, the object processing module 210 is to use the values contained in the object store itself to determine what type of audio tone, if any, will be used. The objects are stored under a folder much like a disk file system, the folder name is displayed on the menu of FIG. 1. Along with the name, a notification option byte (same format as 242F discussed below) is stored as well. If the fields 254A-D of portion 242E are set to 0, then the audio notification is selected from the notification option byte stored with the folder. If the fields 254A-D are set to 1 then the audio notification is selected from the notification option byte within the object, namely 242F. Portion 242F is illustrated in FIG. 12. Portion 242F is similar to portion 242E in that portion 242F includes settable bits 258A, 258B, 258C and 258D. The value represented by bits 258A-258D is used by the object processing module 210 to select a desired audible tone that will be generated by the mobile device 30. This allows the sender to specify, on a per object basis, his or her own selection of audio tones or allowing to honor the recipient's choice. These details are the subject matter of another patent "FLEXIBLE OBJECT NOTIFICATION" issued Oct. 26, 997, U.S. Pat. No. 5,973,612, the content of which is incorporated by reference.

Bit 254E is set if the mobile device 30 should provide a visual indication through the display 34 when the object is received. If bit 254E is not set, the object processing module 210 will examine the values contained in portion 242F to determine if a visual notification will be provided. The sender can control whether or not a visual notification is provided to the user upon receipt of the object 240 by setting or not setting a bit 258E in portion 242F.

Figure 13:
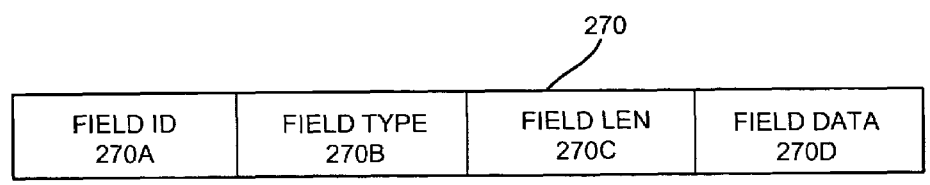
FIG. 13 is a pictorial representation of a format for specifying a field in a record.

FIG. 13 illustrates a part of the format used in the object information 244 when a record of a dataset is to be added, deleted or changed. In other words, as will be shown below, a user can selectively add, delete or change one particular field in a record of a selected dataset. A format 270 is used to identify the particular field and provides new information, if needed. The format 270 includes portions 270A, 270B, 270C and 270D. Portion 270A is a numeric value used to identify a particular field within a dataset. For example, for a "contacts" dataset, each record would include fields for the contact's name, address, work phone, home phone, telefax, etc. Generally, the value associated with a field in the dataset is defined by the order of the fields as they occur in the dataset, beginning at "1". However, in a further preferred embodiment, specific values are selected for certain fields in the event that dataset information is transmitted from one mobile device 30 to another mobile device 30. For example, if a user desires to transfer a selected record of a dataset such as a certain contact in the "contacts" dataset, it may be desirable to assign unique values for each of the fields related to phone numbers so that in the event that the recipient's "contact" dataset is not constructed the same as the sender's "contacts" dataset, the phone numbers are not transposed.

Portion 270B of format 270 contains a value indicative of the type of data contained in the field of the record. For instance, if the field contains data in the form of a string, a first value is present in portion 270B. Other values are used to indicate that the field contains a number, a date, a time, a phone number or a boolean value. Additional values can be defined for other types of data.

Portion 270D of format 270 contains the actual data for the field, while portion 270C indicates the length of the data contained in portion 270D.

Figure 14:
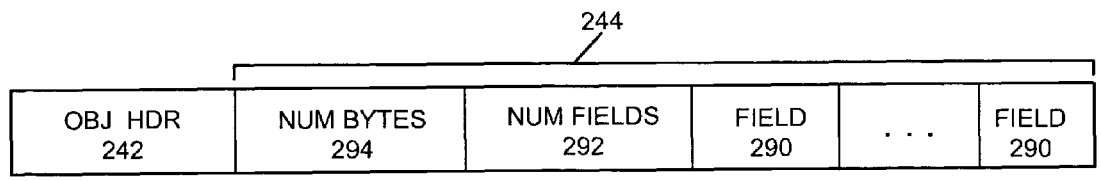
FIGS. 14-16 are pictorial representations of objects to add, delete and change, respectively, data in a dataset.
Figure 15:
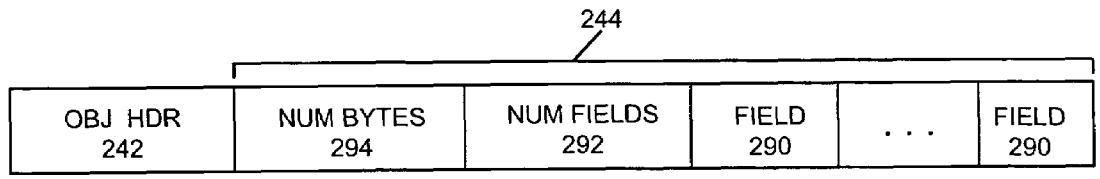
Figure 16:
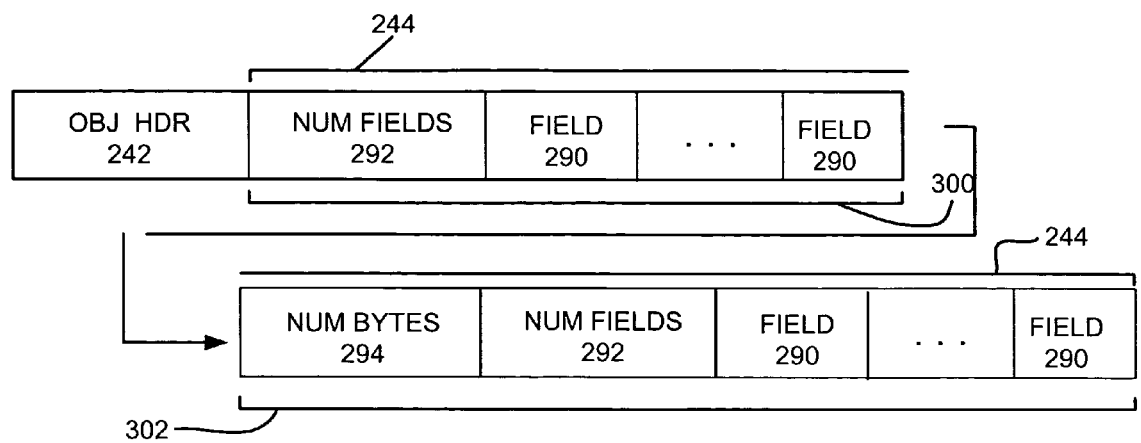

FIGS. 14-16 illustrate the format of objects to add, delete and change a record in a particular dataset, respectively. In FIG. 14, a record can be added to a particular dataset wherein the object header 242 indicates the particular dataset as described above. Individual fields to be added as a record to the dataset identified by the object header 242 are identified by portions 290 in the object information 244. Each portion 290 follows the format 270 described above with respect to FIG. 13. Preferably, the object information 244 also includes a portion 292 that indicates the number of fields or portions 290 contained in the object 240. In addition, a portion 294 is also provided in the object information 244 to indicate the number of bytes of record data to be added to the particular dataset. It should be noted that the portion 294 does not indicate the size of the object 240 comprising the object header 242 and the object information 244, but rather, how much free space will be needed in order to add this record to the particular dataset. If the dataset does not contain one or more of the fields identified by portions 290, the add record operation will fail wherein a suitable error message can be provided by the error processing module 250 described above. However, if the dataset has more fields than that supplied in the object information 244, appropriate default values can be provided for all fields not identified by portions 290.

FIG. 15 illustrates the format of an object 240 to delete a record from a particular dataset. The format includes the object header 242 as described above to identify the particular dataset. To delete a particular record in the dataset, the object processing module 210 uses the information contained in the portions 290 to locate the record in the dataset whose fields match the specified fields in the object 240. Once a match is found, the record is deleted and no more records are searched. If the dataset identified by the object header 242 has more fields than supplied in the object 240, only the fields specified in portions 290 are matched and additional fields are ignored. If the dataset identified by the object header 242 does not contain all of the fields specified in the portions 290, the delete record operation will fail. In the embodiment illustrated, the delete record object as shown in FIG. 15 also includes the portion 292 indicating the number of portions 290 contained in the object and portion 294 indicating the number of bytes of free space created.

FIG. 16 illustrates the format of an object to change a record in a dataset. As in the "add" and "delete" operations discussed above, the object header 242 identifies the particular dataset to be changed. Generally, the object information 244 includes a first portion 300 to locate the record in the dataset identified by the object header 242 using field information similar to the "delete" operation described above. A portion 302 is also provided and is identical to the "add" operation described above. Once a record match is found based on the information in portion 300, data contained in the portion 302 is used to overwrite the corresponding fields in the record. Unmatched fields in the record are left unchanged. If the data in the portion 302 is longer than the original data in the dataset, data in the portion 302 will be truncated.

Figure 17:
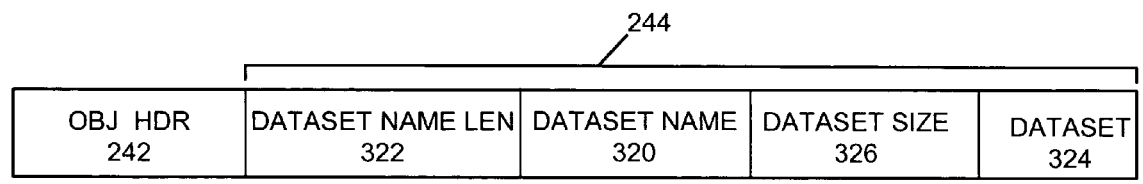
FIG. 17 is a pictorial representation of an object to add or change a dataset.

In addition to adding, deleting and changing a record in a particular dataset, another aspect of the present invention allows the addition, deletion or changing of a complete dataset on the mobile device 30. The format for adding or changing a complete dataset is illustrated in FIG. 17. As discussed above, the object header 242 identifies the particular dataset to be added or changed, while the object information 244 includes a portion 320 indicative of the name of the dataset. The name of the dataset is stored and displayed on the display 34 as discussed above with respect to FIG. 1 when the dataset is viewed. The number of bytes in portion 320 is contained in portion 322. A portion 324 contains the actual data of the dataset, while a portion 326 is provided to indicate the size of the portion 324. The object processing module 210 ascertains whether or not the object is a new dataset to be added or an existing dataset to be changed by examining the identifier length portion 242C of the object header 242. If the value contained in portion 242C (FIG. 9) is non-zero, the object processing module 210 will use the identifier contained in portion 242D to search the memory store 54 for an existing dataset having the matching identifier. If a matching identifier is found, the object processing module 210 will replace the dataset with the object information provided. If a dataset is not found and the "ignore identifier match" bit 246C (FIG. 10) is not set, then the object processing module 210 will discard the received object. However, if a dataset is not found with a matching identifier and the "ignore identifier match" bit 2426C is set, then a new dataset will be created from the object received. In the event that the value contained in the identifier length portion 242C is zero, indicating that a matching identifier does not exist on the mobile device 30, and if the "ignore identifier match" bit 246C is set, then a new dataset will be created from the received object. In contrast, if the "ignore identifier match" bit 246C is not set, then the object processing module 210 will discard the object.

A dataset can be deleted from the mobile device 30 simply by transmitting and processing the object header 242. As discussed above, the object header includes the identifier of the dataset to be deleted in portion 242D as well as the required action of deletion as specified in portion 242B.

Applets 204 can be added, deleted and changed in a manner similar to the method described above for datasets. With respect to FIG. 17, portion 320 includes the name of the applet to be added or changed, while portion 322 indicates the length of the portion 320. Portion 324 includes the applet code, while portion 326 indicates the size of the applet. As with deleting a complete dataset, an applet can be deleted from the mobile device 30 by transmitting and processing the object header 242.

Applet data 205 can be changed in a manner similar to the method described above for changing datasets. Applet data 205 is called a datablock and an applet 204 can have multiple numbers of datablocks numbered from "0" onwards. A datablock can be added, or replaced, or deleted using the following object (similar to FIG. 17) (Obj. Hdr) (Applet Name Len) (Applet Name) (Datablock Number) (Datablock Size) (Datablock . . . ) For the delete operation, there is no need for "datablock size" and "datablock" fields. The system parameters 208 can be added, replaced or deleted in a manner similar to applet data 205, in other words, (Obj. Hdr) (Parameter Number) (Value Size) (Value).

The mobile device 30 further includes a viewer module 400 in FIG. 7. The viewer module 400 accesses the memory store 54 to display the datasets 202 individually. The viewer module 400 is compact in size, but allows the user to easily view, edit and manage each of the datasets 202.

Figure 18:
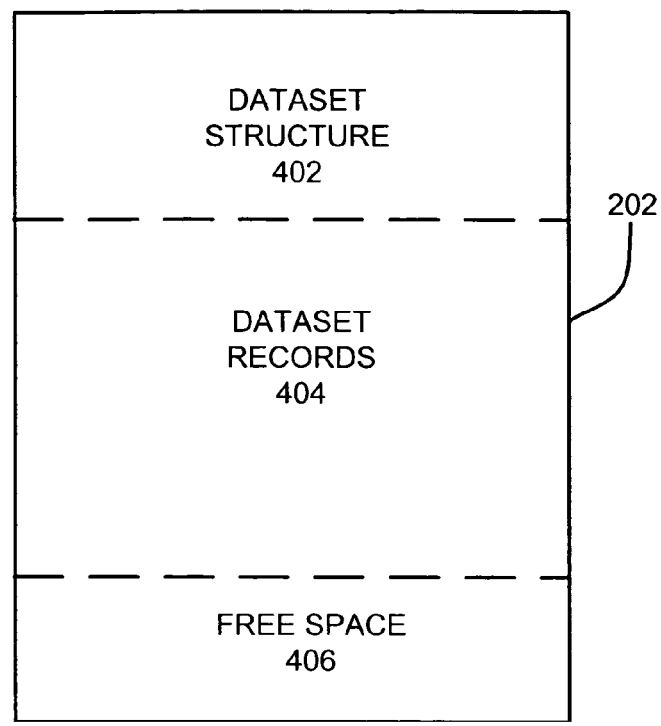
FIG. 18 is a pictorial representation of a dataset.

FIG. 18 illustrates one exemplary format for the dataset 202. In general, the dataset 202 includes a header portion 402 that defines the number and types of individually fields forming each of the records. The individual records are located in a portion 404. In one embodiment, the records in portion 404 are stored as a linked list. In the embodiment illustrated, each dataset 202 created in the memory store 54 is allocated memory upon creation. If additional records can be added to the dataset 202, for example, wirelessly as discussed above with respect to the wireless receiver 52 or through the IR port 46, the portion 404 includes free space 406 that will be used when the new records are received.

In addition to storing the format of the records portion 404, the header portion 402 also includes general information of the dataset 202 as well as control parameters used by the viewer module 400 to display the dataset 202 to the user.

Figure 19:
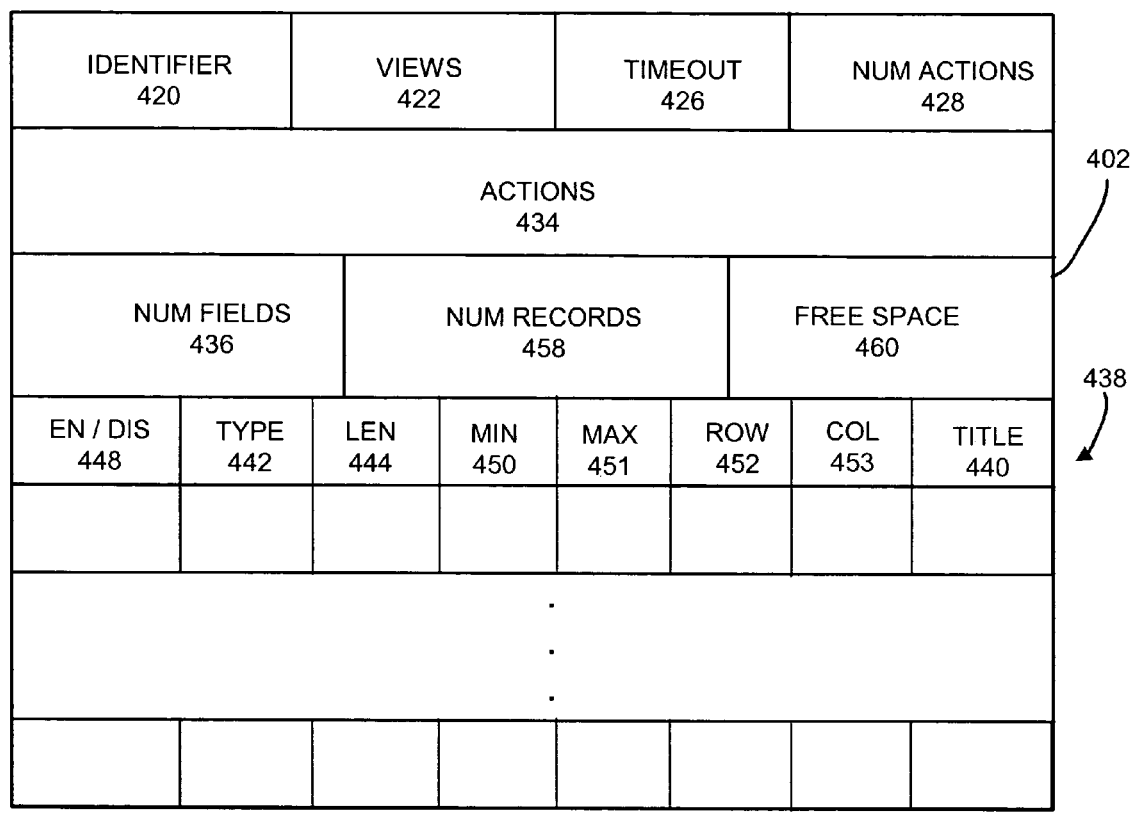
FIG. 19 is a pictorial representation of a portion of the dataset illustrated in FIG. 18.

FIG. 19 is a pictorial representation of the header portion 402 illustrating information stored therein. The header portion 402 includes a unique identifier 420 that identifies the dataset 202 from all other datasets stored in the memory store 54. The identifier 420 can be displayed on the display 34, or alternatively, a separate title entry can be provided in the header portion 402 which is displayed to the user to access the dataset 202. As discussed above, the identifier 420 is used to identify the dataset 202 when records are added, changed or deleted.

Figure 20:
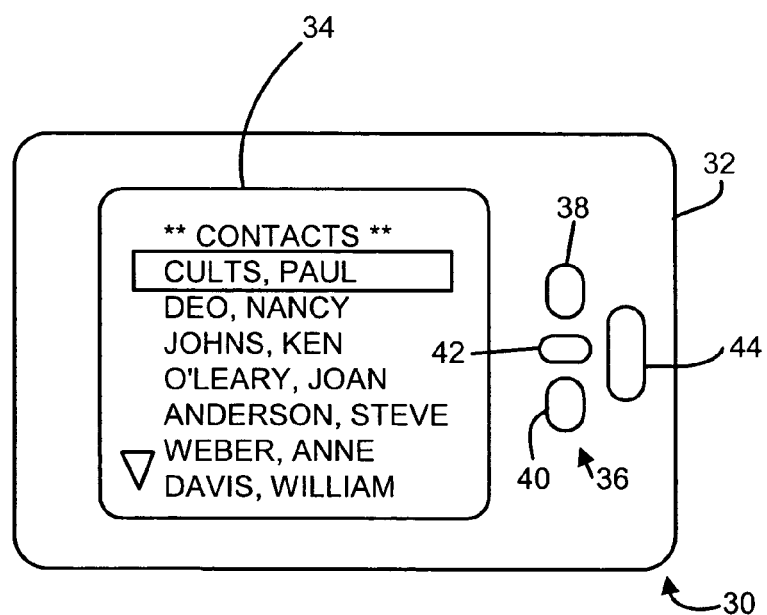
FIGS. 20-22 are screen displays shown on the mobile device.
Figure 21:
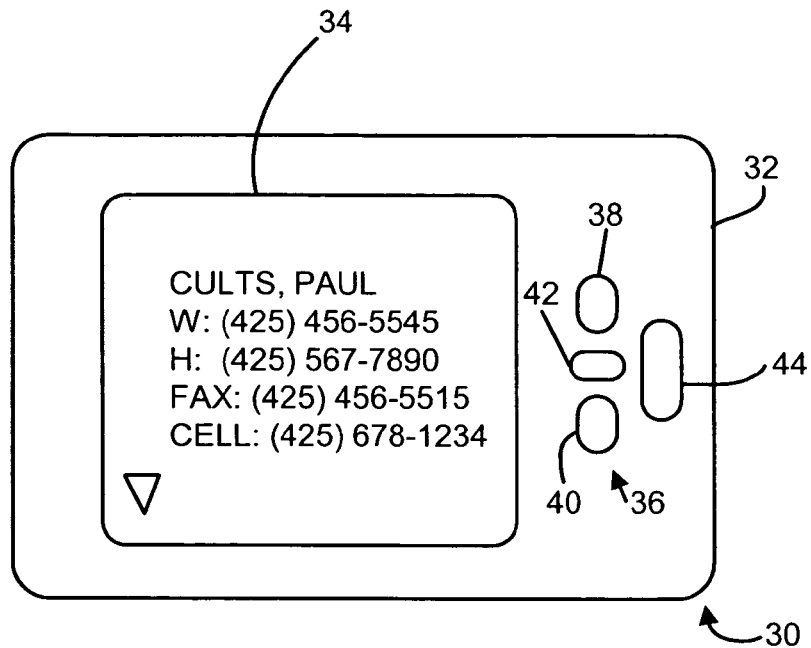

A value 422 is provided in the header portion 402 to indicate the types of views available for viewing the dataset 202. In the embodiment described, records of the dataset 202 can be viewed in the form of a "Table of Contents View" or individually as a "Record View". An example of a "Table of Contents View" is illustrated in FIG. 20. The "Table of Contents View" displays a plurality of records simultaneously on the display 34 wherein each record occupies one line of the display 34. Typically, the length of each record is longer than the display 34 such that only a portion of the record can be displayed. Operation of the keys 36 allows the user to display unseen records as well as unseen portions of records currently being displayed. By operating the keys 36, the user can "highlight" a desired record and upon further operation of the keys 36, display the selected record as a "Record View", which is illustrated in FIG. 21. In the examples illustrated in FIGS. 20 and 21, the dataset is the "contacts" dataset wherein individual records comprise names of people and associated addresses and telephone numbers. In a further embodiment, only selected fields can be displayed in the "Table of Contents View" in order to provide a less cluttered display of information. The value stored at location 422 in the header portion 402 indicates whether the user can display records in the "Table of Contents View" and/or the "Record View".

A value 426 indicates operation of the viewer module 400 due to inactivity of the user after viewing a particular dataset. In the embodiment illustrated, the value 426 corresponds to a "time-out" parameter wherein if the user accesses and views the dataset, but then does not press any of the keys 36 for a selected period of time, the viewer module 400 will exit the dataset and return to the main or root level. For instance, if the value 426 equals "1", the viewer module 400 will display the main or root level if the user does not press any of the keys 36 within a user selectable value (system wide parameter). If, on the other hand, the value 426 equals "0", the viewer module 400 will not automatically return to the main or root level. Although the display 34 may turn off in order to save battery power, upon operation of any of the keys 36, the viewer module 400 will display the dataset, and the particular record, which was last viewed.

Figure 22:
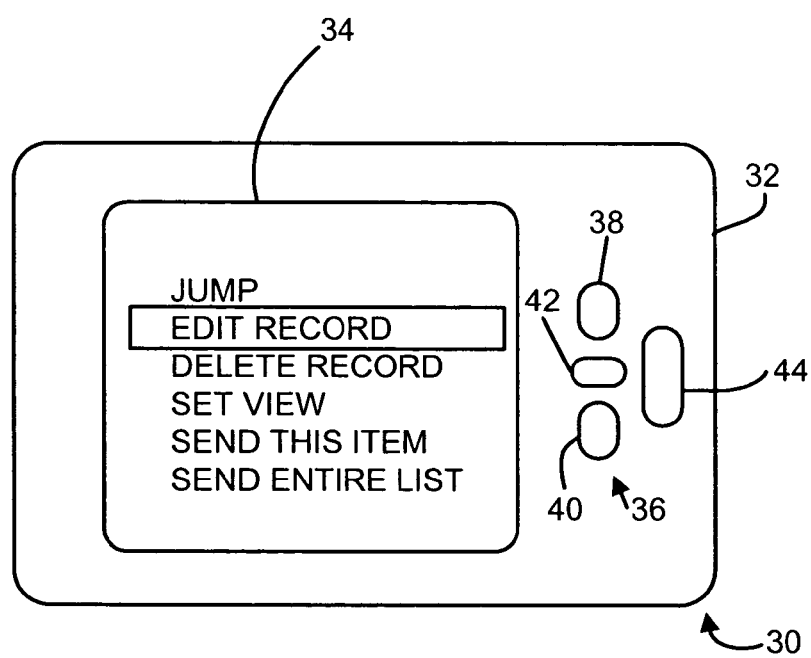

Value 428 in the header portion 402 indicates the number of functions which are available for manipulation of the dataset 202 upon storage in the memory store 54. In the embodiment described, there are five different actions that can be made available to the user for manipulation of the dataset 202. The actions include "editing a record", "deleting a record", "sending a record", "sending a dataset" and "setting field views". These actions are available upon activation of a preselected key when an individual record is being displayed with the "Record View". FIG. 22 illustrates each of the available actions including a "jump" action as displayed on the display 34. Using the keys 36, the user can highlight the desired action to be performed. The "jump" action is used when a long dataset is being viewed. The "jump" action allows the user to jump to a different record of the dataset 202 without having to return to the "Table of Contents View" and scroll through the records to find the desired record.

The "editing a record" action allows the user to make changes to selected fields in a particular record. After highlighting "edit record" in the display 34 illustrated in FIG. 22, the user presses a selected key 36 to then display a list of the fields that can be edited. Using the keys 36, the user can highlight the field to edit and toggle through the characters or digits in order to change individual values.

The "delete record" action allows the user to delete the record from the dataset. In one embodiment, the record that is deleted is the record previously displayed before the list of actions (FIG. 22) was displayed.

The "setting field views" action allows the user to selectively display fields in the dataset 202. Using the "contacts" dataset illustrated in FIGS. 20 and 21, by way of example, if desired, the user can hide the "fax" including the associated value from being displayed when any of the records in the "contacts" dataset are displayed.

The action listed as "send this item" allows the user to send a particular record to another device, such as another mobile device. Highlighting and activation of this action using the keys 36 initiates execution of a transfer module 432 (FIG. 7). The transfer module 432 formats the record and transfers the record to the receiving device using, for example, the IR port 46. Similarly, when the action listed as "send entire list" is highlighted and activated, the complete dataset is transferred to the receiving device through the IR port 46 by the transfer module 432.

It should be noted that other types of actions can be listed and presented to the user in the list of FIG. 22. Such actions can be particularly applicable for certain types of datasets. For instance, a "toggle" action can be provided as an option to the user when the user is accessing a "tasks" dataset. The "toggle" action would allow the user to quickly mark the task as being completed without having to change a particular field through the "edit record" action.

As stated above, value 428 in FIG. 19 indicates the number of actions that can be performed on a particular dataset. Preferably, each of the available actions that can be implemented are listed individually in the header portion 402 as illustrated at 434.

The number of fields in each record is provided in the header portion 402 at 436. Characteristics of each field are then provided in section 438. In the embodiment illustrated, characteristics of each field include a title designation 440 and a type designation 442. Preferably, the available types of fields include a string of characters of variable length, a string of characters of fixed length, boolean variables, a number, a date, a time, phone numbers (U.S. format phone numbers, international format phone numbers and/or free format phone numbers). Other types of fields can include various combinations of the aforementioned, for example, a "reminder" field could include date, time and string fields. The length of the field is indicated at 444. Typically, the length is a quantity of bytes. A selected designation such as "0" can indicate that the field length is not fixed and can be variable.

Value 448 indicates whether the field of the record can be hidden using the "setting field view" action described above. A first preselected value indicates that the field can be hidden, while a second preselected value indicates that the field cannot be hidden.

Values 450, 451, 452 and 453 are used by the viewer module 400 to display the record on the display 34. Value 450 is used to specify the minimum number of characters of the field that are displayed in the "Table of Contents View". Value 451 can be used to control the maximum number of characters that are displayed of the field in the "Table of Contents View". Values 452 and 453 together specify coordinates (row, column) of the first character of the title of the field. It should be noted that special designations can be provided for the values 450-453 to indicate other formatting considerations. For instance, a "0" for value 452 or value 453 indicates that the next available row or column should be used to display the field.

The number of records in the dataset are indicated at 458. The amount of free space (typically given in bytes) is provided at 460. A textual representation of a dataset for storing and viewing stock reports for a particular stock is given below.

```
;
; Sample Stock Dataset
;
GENEREIC,MSFT;      Identifier Bytes
TocView;            RecView or TocView
NoTimeout;          NoTimeout or DefaultTimeout
5;                  Number of functions
Edit,Set View,Delete,Send Record,Send DataSet; Action
7;
;Enable/Disable
; ;Type
; ; ;Len (0=variable)
; ; ; ;Min
; ; ; ; ;Max
; ; ; ; ; ;Row
; ; ; ; ; ; ;Col
; ; ; ; ; ; ; ;Title
E,S,3,3,3,1,1,Day;
E,S,4,0,0,1,5,Date;
D,S,6,6,6,2,1,Low;
D,S,6,6,6,2,8,High;
E,S,6,6,6,2,15,Last;
E,S,0,0,0,4,1,InfoLine1;
E,S,0,0,0,4,1,InfoLine2;
5,100;              Number of Records, Free space
Mo ,5/06,140.00,141.50,112.50,Dow +20;
Tu ,5/07,140.00,141.84,113.50,Qtr Revenues, K;
We ,5/08,141.00,142.95,114.00, , ;
Th. ,5/09,141.50,142.85,114.75,New alliance with NEC,;
Fr ,5/10,142.00,143.00,116.75, , ;
```

(Note that all characters right of a ";" on any line pertain to a comment).

Although the header portion 402 of the dataset 202 includes a considerable amount of flexibility in defining and displaying fields of a dataset, there can still be situations where the structure does not meet the requirements of the user. Another aspect of the present invention allows the user to install a custom viewer module to display information. In the embodiment illustrated in FIG. 7, the custom viewer module is an applet 204 stored in the memory store 54. It should be noted that the memory store 54 can store multiple custom viewer modules as applets wherein each custom viewer module is used to display selected information. The custom viewer module or applet is written in a pseudo-code language that is not machine dependent in order that the applet 204 can be machine independent. As discussed above, the applet can be added or changed to the memory store 54 through the wireless receiver 52. A p-code interpreter 480 accesses the memory store 54 and, in particular, the applet 204 to be executed. Display formats chosen by the user to display information is encoded in the applet 204. The p-code interpreter 480 operates the display 34 in accordance with the encoded instructions contained in the applet 204. Commonly, the applet 204 is written on a computer, such as the desktop computer 55 (FIG. 6) that includes the keyboard 120 and the pointer device 122 to allow the applet 204 to be easily written. As discussed above, the applet 204 can then be transferred to the mobile device 30 using either the wireless receiver 52 or the IR port 46.

Use of the applet 204 as a custom viewer may be best illustrated by an example. Consider the same example described above to deliver stock information. Using the dataset 202 and the viewer module 400, a service provider can send records to update the dataset 202 when new stock reports are issued. However, suppose the service provider would like to provide to the user a "30 day high/low price" or an "average price over the last 30 days". In a typical prior art mobile device, this information is calculated by the service provider and sent as a page to the mobile device. This page like all other pages is retained in a buffer, thereby requiring the user to scroll through all pages in order to find the particular page desired. Using the dataset 202 and the viewer module 400 described above, this information can be defined possibly as a record or as a field in a record of the dataset 202. Nevertheless, the service provider will have to calculate the "30 day high/low price" and the "average price" and send this information to the mobile device 30 as an updated record. However, using an applet 204 as a custom viewer allows the service provider to transfer the calculation steps to the mobile device 30. As discussed above, typically the applet 204 includes an associated applet data 205 that can be updated or changed in a manner similar to updating or changing a record in the dataset 202. In this manner, the service provider need only provide the stock quotes on a periodic or daily basis. Upon execution of the applet 204 using the p-code interpreter 480, the applet 204 operates on the associated applet data 205 to calculate the desired information that being the "30 day high/low price" and the "average price", which are then displayed on the display 34. In this manner, the service provider does not need to calculate the desired information, but rather, only has to update the applet data 205.

Although the present invention has been described with reference to preferred embodiments, workers skilled in the art will recognize that changes may be made in form and detail without departing from the spirit and scope of the invention.

What is claimed is:

1. A computer readable medium including instructions for processing information to alter a field of a record of a dataset, the dataset being stored in memory on a mobile device and having a plurality of similarly structured records, the instructions comprising:
   receiving an object from a wireless receiver, the object having an object header comprising
   a first portion designating an identifier of a dataset from a plurality of datasets and a second portion designating an action to perform, the object further including object information, wherein the object information comprises a format having a first portion designating a field identifier of a field from a plurality of fields; and
   processing the object to ascertain the action to perform to alter data in a field of one of the records as a function of the identifier and the field identifier.

2. The computer readable medium of claim 1 wherein the instructions further comprise:
   reporting if an error occurs during the step of processing.

3. The computer readable medium of claim 1 wherein the action includes at least one of adding, changing and deleting data in the field of one of the records.

4. The computer readable medium of claim 1 wherein the format further comprises a second portion designating field data.

5. The computer readable medium of claim 4 wherein the format further comprises a third portion designating a field type.

6. The computer readable medium of claim 5 wherein the format further comprises a fourth portion designating a length of the field data.

7. A method of processing information to alter a plurality of fields of a dataset, the dataset being stored in memory on a mobile device and having a plurality of similarly structured records, the method comprising:
   receiving an object from a wireless receiver, the object having an object header comprising
   a first portion designating an identifier of a dataset from a plurality of datasets storable in memory on the mobile device and a second portion designating an action to perform, the object further including object information, wherein the object information comprises a format having a first portion designating a plurality of field identifiers associated with the plurality of fields; and
   processing the abject to ascertain the action to perform to alter data in the plurality of fields as a function of the identifier and the plurality of field identifiers.

8. The method of claim 7 and further comprising:
   reporting if an error occurs during the step of processing.

9. The method of claim 7 wherein the action includes at least one of adding, changing and deleting data in at least one field of the plurality of fields.

10. The method of claim 7 wherein the format further comprises a second portion designating field data.

11. The method of claim 10 wherein the format further comprises a third portion designating a field type.

12. The method of claim 10 wherein, the format further comprises a fourth portion designating a length of the field data.

13. A mobile device, comprising:
   a wireless receiver;
   a memory device storing a plurality of datasets, each dataset having a plurality of similarly structured records; and
   the object processing module coupled to the wireless receiver to receive an object therefrom,
   the object having an object header comprising a first portion designating an identifier of a dataset from the plurality of datasets and a second portion designating an action to perform, the abject further including object information, wherein the object information comprises a format having a first portion designating a field identifier of a field from a plurality of fields, wherein the abject processing module processes the object to ascertain the action to perform to alter data in a field of one of the records as a function of the identifier and the field identifier.

14. The mobile device of claim 13 wherein the action includes at least one of adding, changing and deleting data in the field of one of the records.

15. The mobile device of claim 13 wherein the format further comprises a second portion designating field data.

16. The mobile device of claim 15 wherein the format further comprises a third portion designating a field type.

17. The mobile device of claim 16 wherein the format further comprises a fourth portion designating a length of the field data.

18. A mobile device comprising:
   a wireless receiver;

a memory device storing a plurality of datasets, each dataset having a plurality of similarly structured records, each record having a plurality of fields; and an object processing module coupled to the wireless receiver, the object having an object header comprising a first portion designating an identifier of a dataset from the plurality of datasets and a second portion designating an action to perform, the object further including object information, wherein the object information comprises a format having a first portion designating a plurality of field identifiers associated with a plurality of fields of the dataset, wherein the object processing module processes the object to ascertain the action to perform to alter data in the plurality of fields as a function of the identifier and the plurality of field identifiers.

19. The mobile device of claim 18 wherein the action includes at least one of adding, changing and deleting data in at least one field of the plurality of fields.

20. The mobile device of claim 18 wherein the format further comprises a second portion designating field data.

21. The mobile device of claim 20 wherein the format further comprises a third portion designating a field type.

22. The mobile device of claim 20 wherein the format further comprises a fourth portion designating a length of the field data.

23. A method for altering data in a field of a record of a dataset stored in a memory device storing a plurality of datasets, each dataset having an associated address within the memory device and having a plurality of similarly structured records, the method comprising:

receiving an object from a wireless receiver, the object having an object header comprising a first portion designating an identifier of a dataset independent of the address of the dataset storable in the memory device, and a second portion designating an action to perform, the object further including object information comprising a first portion designating a field identifier associated with the field; and processing the object to alter data in the field of the record as a function of the identifier and the field identifier.

24. The method of claim 23 wherein the action includes at least one of adding, changing and deleting data in the field of one of the records.

25. The method of claim 23 wherein the format M e r comprises a second portion designating field data.

26. The method of claim 25 wherein the format further comprises a third portion designating a field type.

27. The method of claim 26 wherein the format further comprises a fourth portion designating a length of the field data.

28. A computer readable medium having instructions that, when implemented, perform a method for altering data in a field of a record of it dataset stored in a memory device storing a plurality of datasets, each dataset having an associated address within the memory device and having a plurality of similarly structured records, the instructions comprising:

receiving an object from a wireless receiver, the object having an object header comprising a first portion designating an identifier of a dataset independent of the address of the dataset storable in, the memory device, and a second portion designating an action to perform, the object further including object information comprising a first portion designating a field identifier associated with the field; and processing the object to alter data in the field of the record as a function of the identifier and the field identifier.

29. The computer readable medium of claim 28 wherein the action includes at least one of adding, changing and deleting data in the field of one of the records.

30. The computer readable medium of claim 28 wherein the format further comprises a second portion designating field data.

31. The method of claim 30 wherein the format further comprises a third portion designating a field type.

32. The method of claim 31 wherein the format further comprises a fourth portion designating a length of the field data.

* * * * *

UNITED STATES PATENT AND TRADEMARK OFFICE
CERTIFICATE OF CORRECTION

PATENT NO. : 7,444,143 B2
APPLICATION NO. : 10/996205
DATED : October 28, 2008
INVENTOR(S) : Vinay Deo, Michael J. O'Leary and Robert B. Seidensticker Page 1 of 1

It is certified that error appears in the above-identified patent and that said Letters Patent is hereby corrected as shown below:

In the Specification:

Column 2, line 17, "21" should read -- 1 --.

Column 11, line 27, "997" should read -- 1999 --.

In the Claims:

Column 18, line 23, claim 7, "abject" should read -- object --.

Column 18, line 35, claim 12, "wherein, the" should read -- wherein the --.

Column 18, line 43, claim 13, "the object" should read -- an object --.

Column 18, line 48, claim 13, "the abject" should read -- the object --.

Column 18, line 51, claim 13, "the abject" should read -- the object --.

Column 20, line 4, claim 25, "M e r" should read -- further --.

Column 20, line 13, claim 28, "it" should read -- a --.

Column 20, line 20, claim 28, "storable in, the" should read -- storable in the --.

Signed and Sealed this
Fourth Day of June, 2013

Teresa Stanek Rea
*Acting Director of the United States Patent and Trademark Office*